United States Patent [19]
Sai

[11] Patent Number: 5,099,144
[45] Date of Patent: Mar. 24, 1992

[54] APPARATUS FOR OPTICAL POWER TRANSMISSION AND OPTICALLY POWERED SYSTEM

[75] Inventor: Yukio Sai, Tokorozawa, Japan

[73] Assignee: Kabushiki Kaisha Toshiba, Kawasaki, Japan

[21] Appl. No.: 458,803

[22] Filed: Dec. 28, 1989

[30] Foreign Application Priority Data

Dec. 28, 1988 [JP] Japan .................................. 63-328954
Jul. 29, 1989 [JP] Japan .................................. 1-195421

[51] Int. Cl.⁵ .............................................. G02B 27/00
[52] U.S. Cl. ................................ 250/551; 2509/227.21
[58] Field of Search ................... 250/227.11, 227.21, 250/205, 212; 307/311; 73/862.59

[56] References Cited

U.S. PATENT DOCUMENTS 4,345,482  8/1982  Adolfsson et al. ............. 250/227.21
4,490,606 12/1984  Lockett et al. ................. 250/227.21
4,899,044  2/1990  Hansen et al. ...................... 250/551

OTHER PUBLICATIONS

Paul Bjork et al., "Optically Powered Snsors", OFS'88, ThEE, 1988, pp. 4-1 - 4-4.
Yukio Sai et al., "Optically Powered Sensor Driven by One Si-Solar Cell", SICE '89, Jul. 25-27, JS 54-5, pp. 551-552.

Primary Examiner—David C. Nelms
Attorney, Agent, or Firm—Foley & Lardner

[57] ABSTRACT

An apparatus for optical power transmission capable of reducing a number of photo cells and improving a power transmission efficiency, and an optically powered system using the apparatus capable of maximizing lifetime of light sources. The apparatus includes an alternating current transformer for transforming the electric power to a desired level for a load. The system further includes a device for detecting magnitude of the electric power, and a device for controlling an amount of light emission by the light source in accordance with the detected magnitude of the electric power such that the magnitude of the electric power to be given to the load is maintained to be substantially constant.

12 Claims, 6 Drawing Sheets

ı

APPARATUS FOR OPTICAL POWER TRANSMISSION AND OPTICALLY POWERED SYSTEM

BACKGROUND OF THE INVENTION

1. Field of the Invention

The present invention relates to an apparatus for optical power transmission suitable for an application in an optically powered system in which a driving power of an electronic device such as a sensor is supplied from a distant driver section, and an output signal of the electronic device is transmitted to the driver section, both optically.

2. Description of the Background Art

In order to prevent the introduction of noises through a power supply and signal line, a small electronic device is used, usually of the battery driven optical transmission type which utilizes a chemical battery such as lithium cells or a solar battery such as photo cells.

Now, the use of a chemical battery necessitates regular replacement of the lithium cells, whereas, as shown in FIG. 1, the use of a solar battery in a small electronic device 3 requires a number of photo cells 1 to be connected in series in order to obtain a sufficient loading voltage with respect to a load 2. This is because a single photo cell is capable of generating only about 0.5 V, which alone is insufficient for driving the load 2. In addition, with a solar battery, the whole electronic device 3 is required to have a large enough size to accommodate necessary photosensitive areas.

As a solution, there has been proposed an optically powered system in which electric power is first converted into an optical power at a transmitting side by means of a light emitting element such as a laser diode, the converted optical power is then transmitted to a receiving side through an optical path such as an optical fiber or an optical wave guide, and the received optical power is converted back to the electric power to be loaded on the load at the receiving side by means of photo cells.

An example of a conventional optically powered system is shown in FIG. 2, in which light from a light emitting element 11 driven by a power source 9 of a driving section 10 is transmitted to a signal processing section 20 through an optical fiber 12, and converted into electric power by photo cells 13 of the signal processing section 20. The converted electric power is then utilized to drive a sensor 14. An output signal of the sensor 14 is processed at a processor 15, and the processed sensor output signal is converted into light signal at an E/O converter 16 and transmitted through another optical fiber 17 back to the driving section 10. The received sensor output signal in a form of light signal is then re-converted into an electric sensor output signal at an O/E converter 18 of the driving section 10.

In such an optically powered system, an introduction of noises through a power supply line can be prevented without need to ensure sufficient light exposure or large enough photosensitive areas, so that it becomes possible to make the system compact.

However, such an optically powered system still requires a number of photo cells to be connected in series, because as mentioned earlier a single photo cell is capable of generating only about 0.5 V.

Furthermore, in order to make each photo cell generate power at high efficiency it is necessary to divide the light coming from the optical path into a number of equal parts. This in turn requires a light dividing device such as a diffraction grating 25 shown in FIG. 3, or an optical star coupler 26 shown in FIG. 4, but an incorporation of such a light dividing device inevitably makes the system complicated.

Meanwhile, there is also a problem concerning a matching of load impedance of the photo cells and the impedance required by the load.

Namely, as shown in FIG. 5, the power extractable from a photo cell is determined from an area on a V-I plot enclosed by V and I axes and lines parallel to V and I axes passing through an intersection P of a V-I characteristic curve 27 and a load characteristic curve 28, which appears shaded in FIG. 5. Since these characteristic curves 27 and 28 are different for the different amounts of incident light, there is a unique set of the amount of incident light and the load impedance for a given amount of power for which the maximum efficiency is obtainable, i.e., the area of shaded region in FIG. 5 is largest. The maximum efficiency is achieved by a load impedance of the photo cell of approximately 100Ω for incident light beams of 1 to 10 mW.

On the other hand, the small electronic device of concern here is a micropower system requiring less than 1 mW of power, which corresponds to an impedance of approximately 10KΩ for driving voltage of 2.0 V.

Thus, even when a number of photo cells are connected in series, the maximally efficient load impedance for the photo cells are far short of the impedance required by the load, so that the efficient extraction of power from the photo cells has been impossible.

In this regard, as mentioned earlier, a single photo cell is capable of generating only about 0.5 V. Use of amplifier circuitry to solve this problem is prohibited, since there is no amplifier circuitry which can operate at such a low voltage.

For this reason, in optically powered systems, the light to electricity conversion efficiency has been low.

In addition, there is a considerable power loss due to dissipation in the optical path, so that it has been necessary for the transmitting side to supply an amount of power which is a number of times greater than that required at the receiving side.

In the optically powered system, such as shown in FIG. 2, semiconductor lasers are usually employed as light sources, and it is well known that the lifetime of a semiconductor laser is inversely proportional to a square to fourth power of a light emission power, so that as the light emission power increases as in the optically powered system, the lifetime of the semiconductor laser shortens exponentially.

Moreover, a conventional optically powered system is required to use larger than otherwise necessary amount of power in order to be able to deal with fluctuations in the light emission efficiency of the semiconductor lasers, fluctuation in the conversion efficiency of the photo cells due to environmental conditions, and the greatest amount of power loss in the optical path occurring for the longest optical path to be used.

Therefore, the lifetime of the semiconductor lasers in the optically powered system has been made unnecessarily shorter than that inevitably required by the operation of the system alone.

SUMMARY OF THE INVENTION

It is therefore an object of the present invention to provide an apparatus for optical power transmission capable of reducing a number of photo cells to be required, and of improving a power transmission efficiency between the photo cells and the load.

It is also an object of the present invention to provide an optically powered system capable of maximizing the lifetimes of light sources regardless of transmission distance and environmental conditions.

According to one aspect of the present invention there is provided an apparatus for optical power transmission, comprising: light emitting element means for emitting an optical power in a form of a light signal with alternating component in accordance with a given amount of electric power; an optical path for transmitting the optical power emitted by the light emitting element means; a photoelectric element means for converting the optical power transmitted through the optical path into electric power; and an alternating current transformer means for transforming the electric power obtained by the photoelectric element means to a transformed electric power at a desired level for a load to be driven by the transformed electric power.

According to another aspect of the present invention there is provided an optically powered system, comprising: an optical path for transmitting optical signals; a first section including: first photoelectric element means for converting a first light signal transmitted to the first section through the optical path into an electric power; means for detecting the magnitude of the electric power obtained by the first photoelectric element means, which produces a first output signal indicating the detected magnitude of the electric power; a load to be driven by the electric power obtained by the second photoelectric element means, which produces a second output signal; and first light emitting element means for emitting, to the optical path, a second light signal conveying the first and second output signals; and a second section including: second light emitting element means for emitting an optical power in a form of the first light signal to the first photoelectric element means through the optical path; second photoelectric element means for converting the second light signal transmitted from the first light emitting element means to the first section through the optical path into an electric signal expressing the first and second output signals; and means for controlling an amount of light emission by the second photoelectric element means by changing the given electric power in accordance with the magnitude of the electric power indicated by the first output signal expressed in the electric signal obtained by the second photoelectric element means, such that the magnitude of the electric power at the second photoelectric element means is maintained substantially constant.

Other features and advantages of the present invention will become apparent from the following description taken in conjunction with the accompanying drawings.

DETAILED DESCRIPTION OF THE PREFERRED EMBODIMENTS

Figure 1:
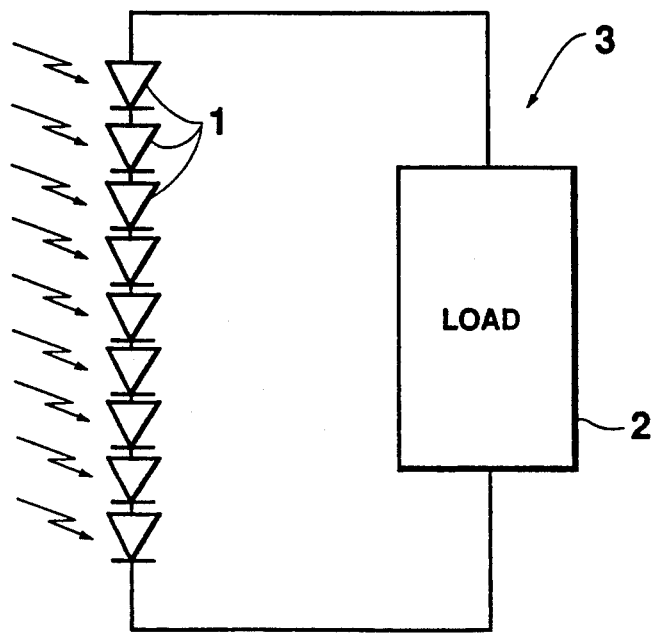
FIG. 1 is a schematic diagram of conventional small electronic device using photo cells as a power source.
Figure 2:
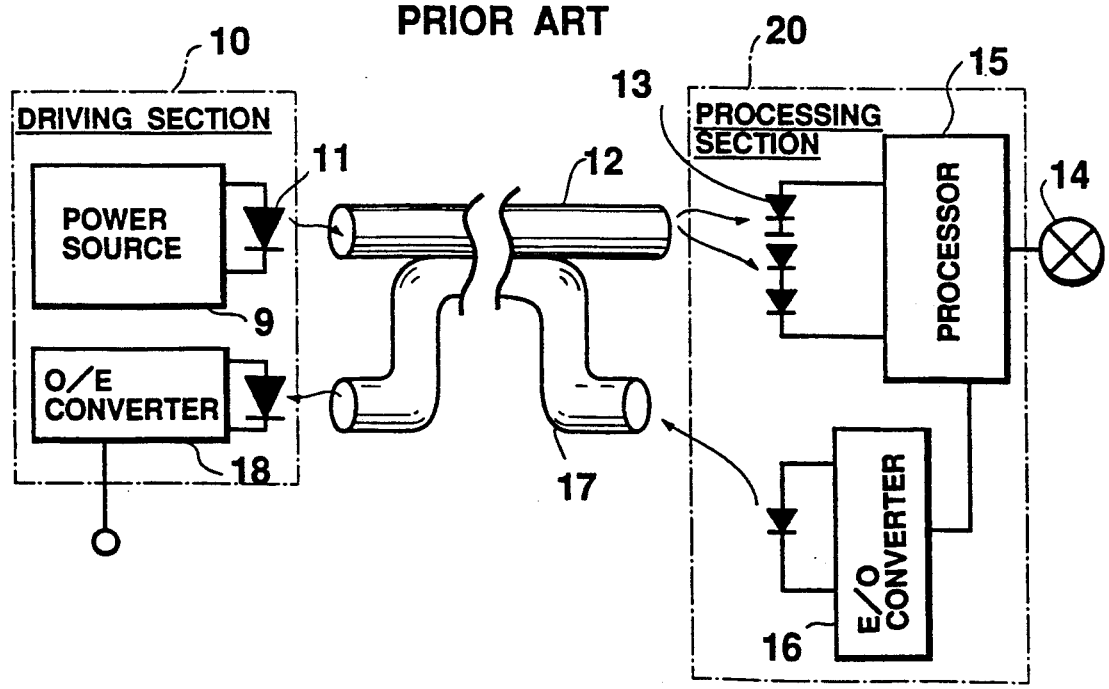
FIG. 2 is a schematic block diagram of a conventional optically powered system.
Figure 3:
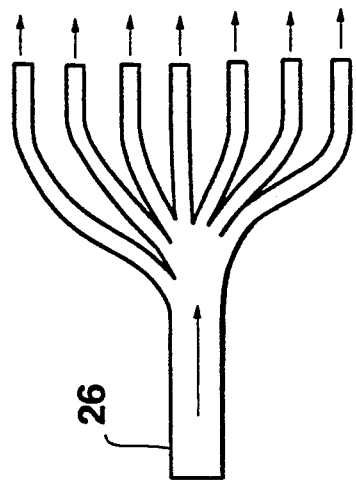
FIG. 3 is a diagram of a diffraction grating to be used in the system of FIG. 2.
Figure 4:
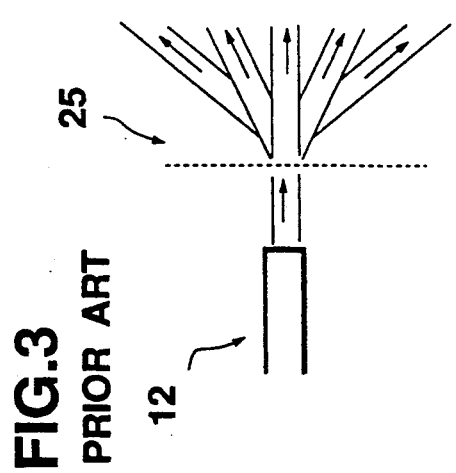
FIG. 4 is a diagram of a optical star coupler to be used in the system of FIG. 2.
Figure 5:
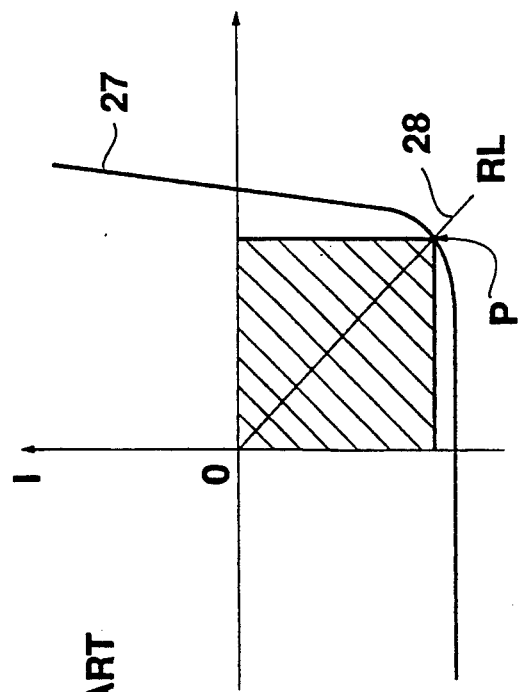
FIG. 5 is a V-I plot for the system of FIG. 2 for explaining the problem associated with the system.
Figure 6:
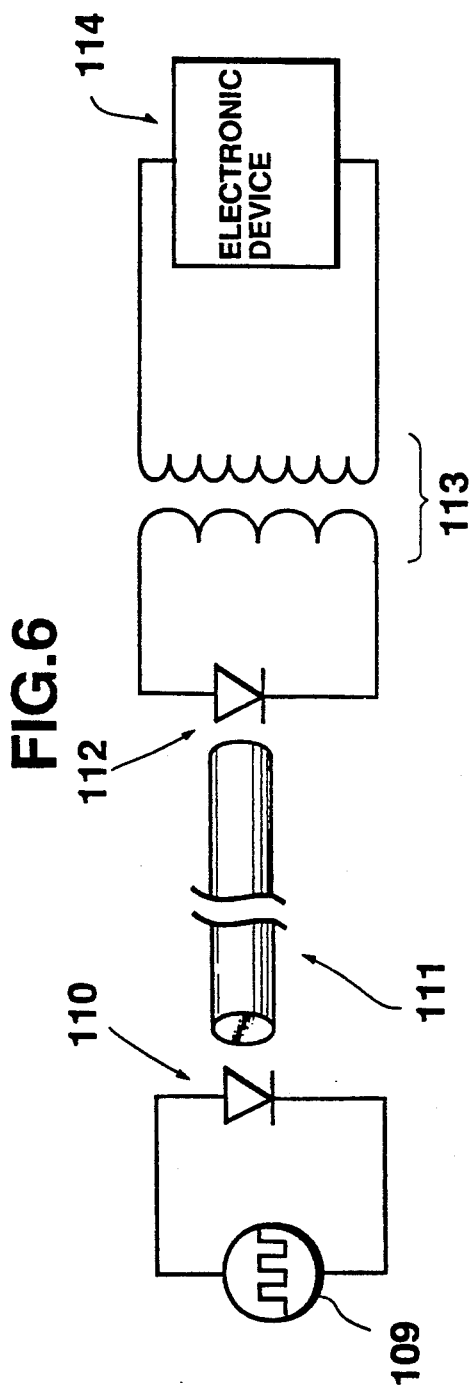
FIG. 6 is a schematic block diagram of one embodiment of an apparatus for optical power transmission according to the present invention.

Referring now to FIG. 6, there is shown one embodiment of an apparatus for optical power transmission according to the present invention.

In this embodiment, the apparatus comprises a transmitting side including an electric power source 109 for generating electric power and a laser diode 110 for converting the electric power from the electric power source 109 into optical power, an optical path in a form of an optical fiber 111 for transmitting the optical power from the laser diode 110, and a receiving side including a PIN photo diode 112 for converting the optical power from the optical fiber 111 to the electric power, an alternating current transformer 113 for transforming the electric power from the PIN photo diode 112, and a load in a form of an electronic device 114 to be driven by the transformed power from the alternating current transformer 113.

In the apparatus for optical power transmission, the electric power is converted into the optical power in the transmitting side, the power in a form of the optical power is transmitted through the optical path, and the optical power is converted back into the electric power to be given to the load in the receiving side.

In this embodiment, the electric power source 109 generates alternating voltage in a form of rectangular pulses, so that the optical power transmitting through the optical fiber 111 is in a form of periodically discontinuous light, i.e., light with alternating components. As a consequence, the electric power obtained by the PIN photo diode 112 is in a form of alternating voltage.

For this reason, the alternating current transformer 113 is provided between the PIN photo diode 112 and the electronic device 114. At the alternating current transformer, the electric power from the PIN photo diode 112 is transformed in accordance with the ratio of the numbers of turns on a primary side (PIN photo diode 112 side) and a secondary side (electronic device 114 side) up to a voltage level sufficient for driving the electronic device 114. Thus, by setting the numbers of turns on the primary and secondary sides of the alternating current transformer 113 appropriately, sufficient driving voltage for the electronic device 114 can be obtained even with a single PIN photo diode 112. Consequently, in this embodiment it is not necessary to connect a number of photo cells in series in order to obtain the sufficient driving voltage, so that there is no need to divide the optical power, and the structure of the apparatus can significantly be simplified.

In addition, in this embodiment, the alternating current transformer 113 acts as an impedance matcher, in the following manner.

Namely, in the alternating current transformer 113, the load impedance considered from the primary side is inversely proportional to the square of the ratio of the number of turns on the primary and secondary sides, so that for the actual load impedance considered from the secondary side) of 10KΩ and the ratio of the number of turns of 10, the load impedance considered from the primary side is about 100Ω. Thus, for a photo diode with a 1 to 10 mA photo current, for which the maximal efficiency is obtained for the load impedance of about 100Ω, the impedance matching at the maximal efficiency of the photo diode can be achieved for an electronic device requiring a relatively low load impedance of about 10KΩ.

There are several variations that can be made to the above embodiment.

Figure 7:
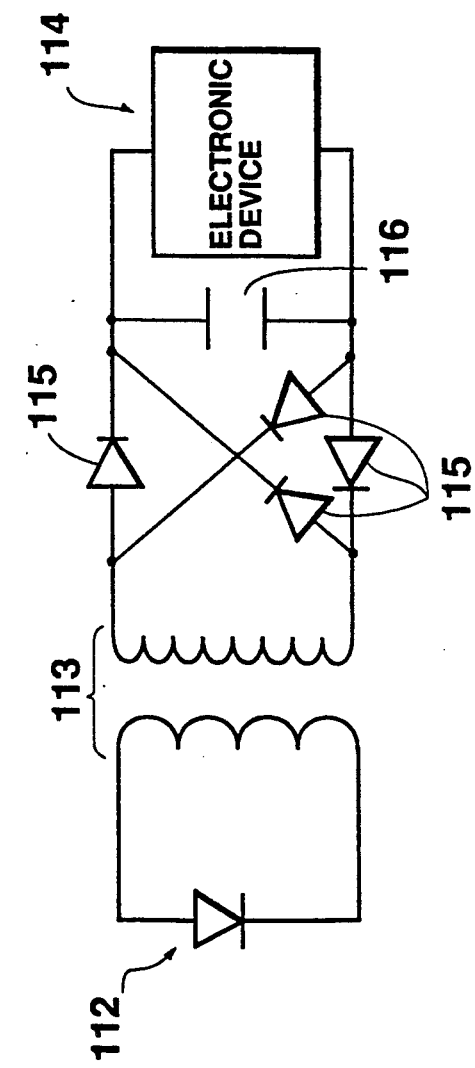
FIG. 7 is schematic block diagram of one possible variation for the embodiment of FIG. 6.
Figure 8:
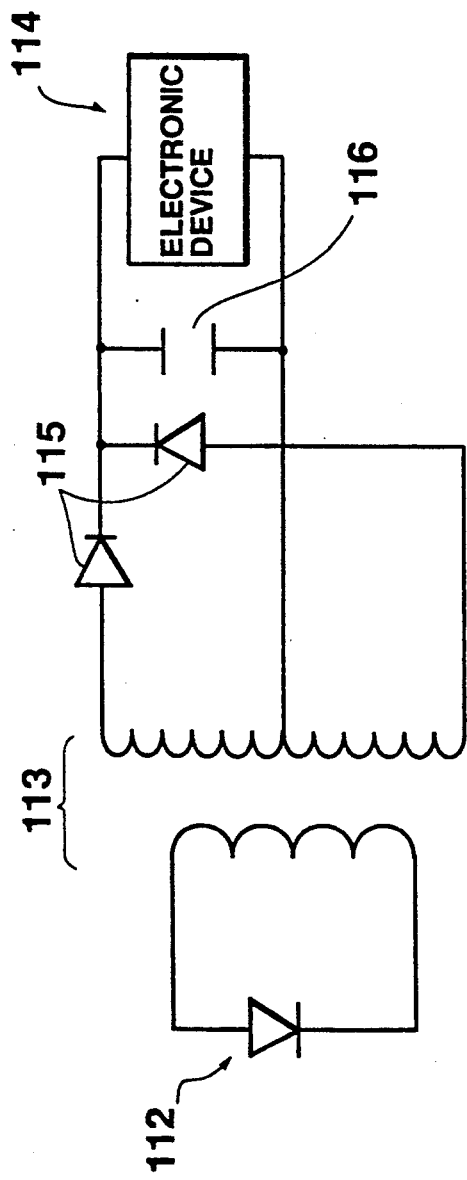
FIG. 8 is schematic block diagram of another possible variation for the embodiment of FIG. 6.

First, the above embodiment may be modified as shown in FIG. 7 and FIG. 8 in order to deal with the direct loading voltage instead of the alternating loading voltage, by incorporating, between the alternating current transformer 113 and the electronic device 114, rectifier smoothing circuitry constructed from diodes 115 and a capacitor 116 in various known configurations such as those shown in FIG. 7 and FIG. 8.

Figure 9:
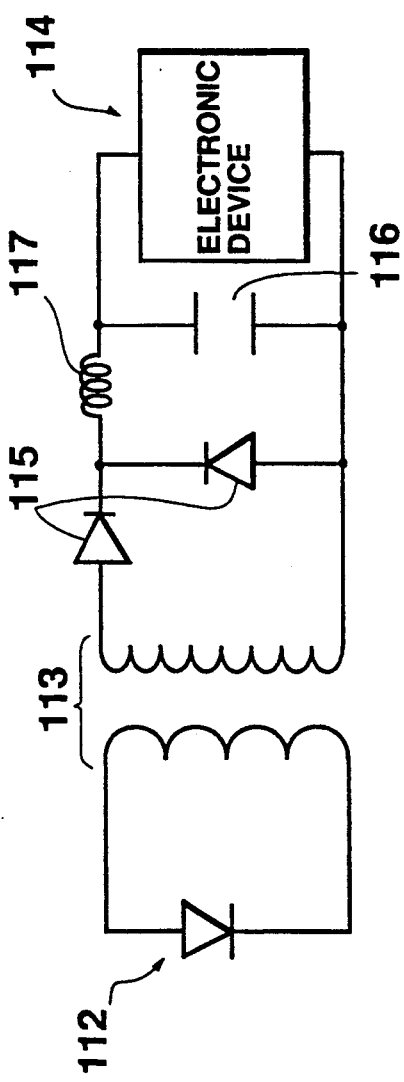
FIG. 9 is schematic block diagram of still another possible variation for the embodiment of FIG. 6.

Secondly, the above embodiment may further be modified as shown in FIG. 9 by incorporating a commutating circuitry constructed from diodes 115, a capacitor 116 and an inductance 117 so as to improve the power extraction from the capacitor 116.

It is also to be noted that in the above embodiments, the electric power source 109 may be changed to generate the direct voltage while the light emitted from the laser diode 110 is optically switched on and off in order to obtain light with the alternating components.

Also, the number of the laser diode 110 and that of the PIN photo diode 112 may be increased to more than one.

Now, in principle, perfect impedance matching is possible by the above embodiment.

However, in reality, impedance matching can be maintained because of the non-linearity of the V-I characteristic of the photo diode which makes the value of the load impedance for the maximum power extraction change along with change in an amount of incident light. This implies that in order to maintain good impedance matching, it is necessary to maintain the amount of the incident light constant.

For this reason, it is necessary to be able to adjust the amount of light emission from the laser diode in the transmitting side in accordance with the amount of the incident light on the PIN photo diode on the receiving side. This require feed back of information on the amount of the incident light on the PIN photo diode from the receiving side to the transmitting side, since the amount of dissipation in the optical path cannot be determined beforehand as it varies for different optical paths of different lengths.

Figure 10:
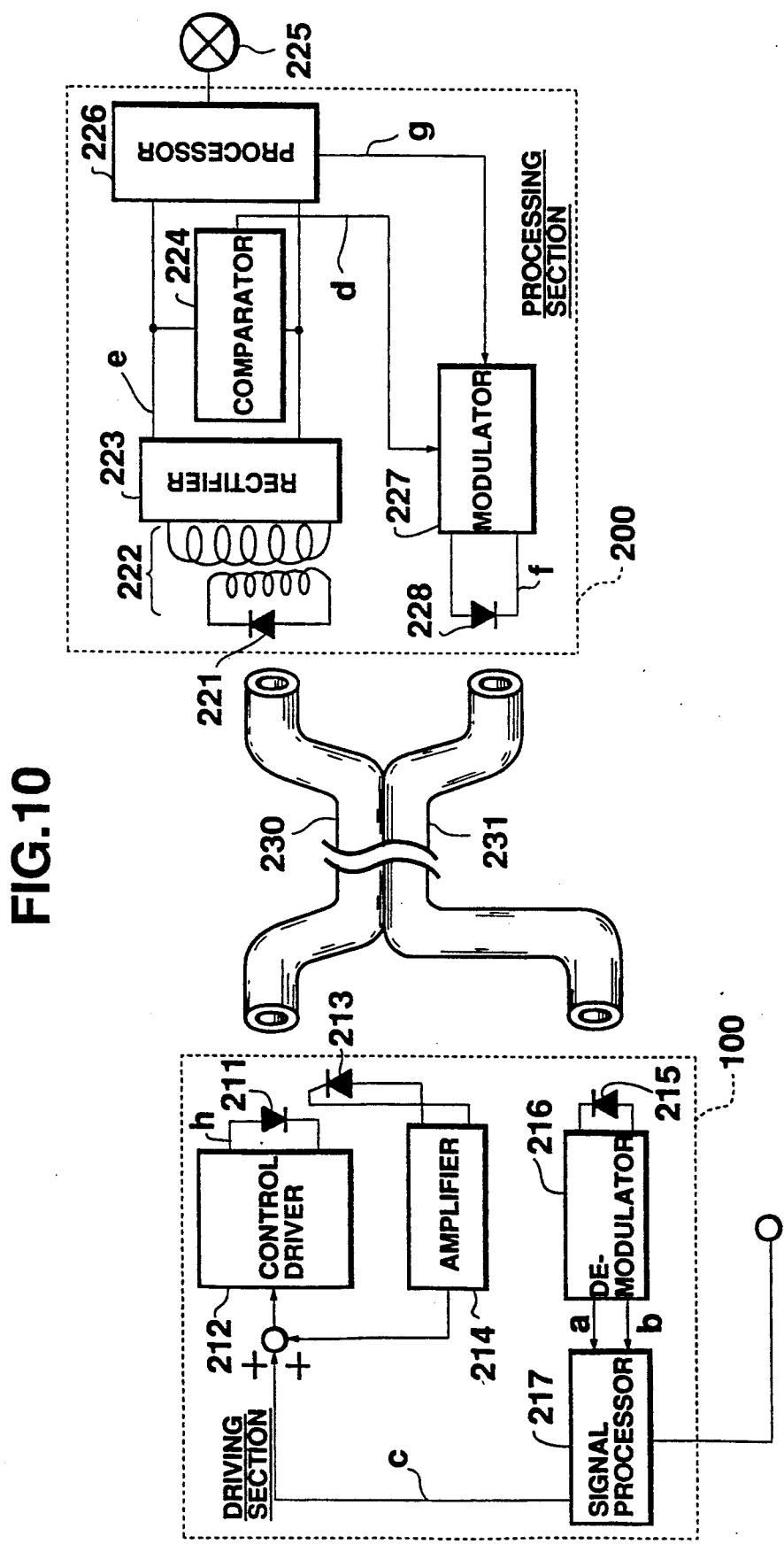
FIG. 10 is a schematic block diagram of one embodiment of an optically powered system according to the present invention.

Such a feature can be realized as in one embodiment of an optically powered system according to the present invention shown in FIG. 10.

In this embodiment, the system generally comprises a driving section 100, a processing section 200, and a pair of optical fibers 230 and 231 connecting the driving section 100 and the processing section 200.

The driving section comprises a semiconductor laser 211 for emitting light signal to the processing section 200 through the optical fiber 230, a control driver 212 for controllably driving the semiconductor laser 211, a monitor photo diode 213 for monitoring the amount of light emission by the semiconductor laser 211, an amplifier 214 for amplifying current from the monitor photo diode 213, a photo diode 215 for converting light signal coming from the processing section 200 through the optical fiber 231 into electric signal, a demodulator 216 for separating two components a and b to be explained below from the converted electric signal by demodulating, and a signal processor 217 for processing the separated components in appropriate forms suitable for further use of the signal.

The processing section 200 comprises a photo diode 221 for converting the light signal coming from the driving section 100 through the optical fiber 230 into electric signals, an alternating current transformer 222 for transforming the converted electric signal into a higher alternating voltage, a rectifier 223 for rectifying the alternating voltage from the alternating current transformer 222 into direct voltage, a comparator 224 for comparing the direct voltage from the rectifier 223 with prescribed reference voltages specifying upper and lower thresholds for preferable range of the direct voltage, a sensor 225 driven by the direct voltage from the rectifier 223, a processor 226 for processing output signals of the sensor 225, a modulator 227 for combining an output signal from the comparator 224 and the sensor output signal processed at the processor 226, and a light emitting element 228 for emitting the light signal to the driver section 100 through the optical fiber 231 which is driven by the output signal of the modulator 227.

The semiconductor laser 211 is modulated by a pulse signal of few KHz to few tens of KHz, so that the amplifier 214 performs the peak value control by a peak hold circuit or a mean value control by an integration circuit.

Because of this frequency modulation of the semiconductor laser 211, the electric signal obtained at the photo diode 221 from the light signal transmitted from the semiconductor laser 211 through the optical fiber 230 to the photo diode 221 is in a form of alternating voltage, so that the alternating current transformer 222 is provided to transform this electric signal in a form of alternating voltage.

In this embodiment, the output signal from the sensor 225 is transmitted in a form of the light signal to the driver section 100 after receiving such processing as an amplification at the processor 226, converted into frequency signals at the modulator 227, and then converted into the light signals at the light emitting element 228. The received sensor output signal in a form of the light signal is then demodulated at the demodulator 216 and processed at the signal processor 217 so as to recover the electric sensor output signal in a form appropriate for further use.

Meanwhile, in this embodiment, the amount of light emission at the semiconductor laser 211 is controlled in accordance with the output signal of the comparator 224, so as to maintain the direct voltage given to the sensor 225 by the rectifier 223 at a constant level within a tolerable range.

In further detail, this controlling is achieved as follows.

Figure 11:
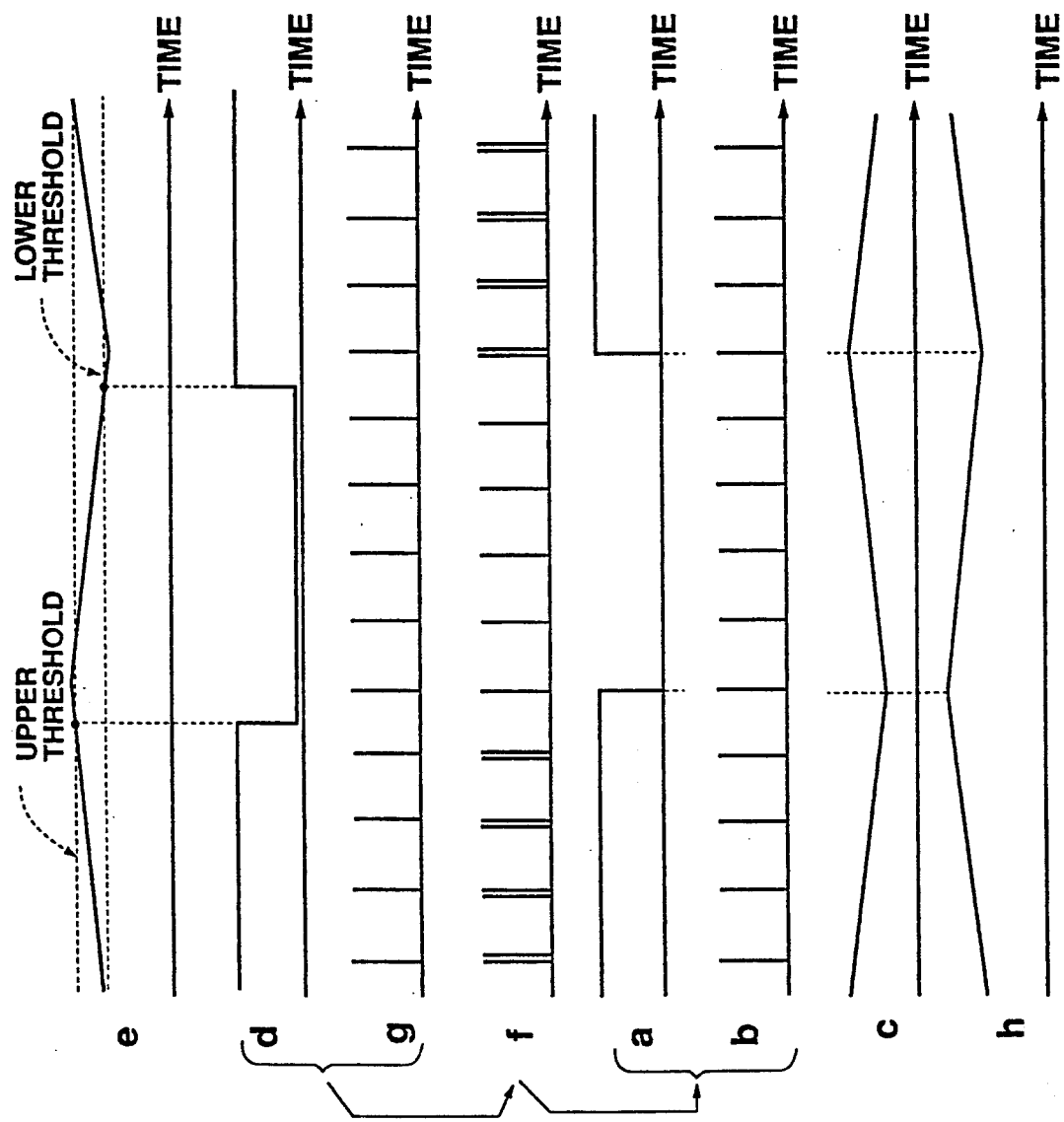
FIG. 11 is a timing chart for signals and voltages in the embodiment of FIG. 10 for explaining its operation.

Namely, as shown in FIG. 11, when the amount of light emission by the semiconductor laser 211 is insufficient, the direct voltage (e) obtained by the rectifier 223 is less than the lower threshold specified by the prescribed reference voltage, and the output signal (d) of the comparator 224 becomes non-zero, whereas when the amount of light emission by the semiconductor laser 211 is excessive, the direct voltage (e) obtained by the rectifier 223 is more than the upper threshold specified by the prescribed reference voltage, and the output signal (d) of the comparator 224 becomes zero.

Meanwhile the sensor output voltage (g) in the form of a frequency signal is obtained by the processor 226, and the modulator 227 combines the output signal (d) of the comparator 224 and the sensor output voltage (g) into a combined signal (f) as follows.

Namely, when the output signal (d) of the comparator 224 is non-zero, the combined signal (f) is obtained by making pulses of the sensor output signal (g) into double pulses, whereas when the output signal (d) of the comparator 224 is zero, the combined signal (f) is obtained by retaining single pulses of the sensor output signal (g) as they are.

This combined signal (f) is then demodulated at the demodulator 216 so as to obtain a component (a) corresponding to the output signal of the comparator 224 and another component (b) corresponding to the sensor output signal.

The signal processor 217, in addition to processing the component (b) in appropriate form, produces an output signal (c) which is monotonously decreasing when the component (a) is non-zero and monotonously increasing when the component (a) is zero.

Now, the control driver 212 controls the electric power (h) to drive the semiconductor laser 211 such that a sum of the signals from the amplifier 214 which is proportional to the amount of light monitored by the monitor photo diode 213 and from the signal processor 217 is maintained at a constant level, so that the electric power (h) given to the semiconductor laser 211 is monotonously increasing when the output signal (c) of the signal processor 217 is monotonously decreasing, and is monotonously decreasing when the output signal (c) of the signal processor 217 is monotonously increasing.

Accordingly, the direct voltage (e) from the rectifier 223 also alternates between monotonous increase and monotonous decrease, within a vicinity of the voltage levels specified by the upper and lower thresholds.

Thus, in this embodiment, the amount of the light emission at the semiconductor laser 211 is controlled such that the direct voltage given to the sensor 225 by the rectifier 223 is maintained at a minimal level required by the sensor 225 within a tolerable range, so as to minimize the excessive light emission by the semiconductor laser 211 and thereby to prolong the lifetime of the semiconductor laser 211 as much as possible.

Thus, according to this embodiment, it is possible to reduce a number of photo cells to be required, and to improve a power transmission efficiency between the photo cells and the load.

Furthermore, according to this embodiment, it is also possible to maximize the life of the light sources regardless of transmission distance and environmental conditions.

It is to be noted that in the above embodiment, the pair of optical fibers 230 and 231 may be replaced by a single optical fiber equipped with directional optical connectors for separating light signals transmitted in different directions at its ends.

It it further to be noted that the variations of the first embodiment described above with FIGS. 7, 8, and 9 may be incorporated into the second embodiment just described.

It is also to be noted that besides those already mentioned, many modifications and variations of the above embodiments may be made without departing from the novel and advantageous features of the present invention. Accordingly, all such modifications and variations are intended to be included within the scope of the appended claims.

What is claimed is:

1. An optically powered system, comprising:
an optical path for transmitting optical signals;
a first section including:
first photoelectric element means for converting a first light signal transmitted to the first section through the optical path into electric power;
means for detecting the magnitude of the electric power obtained by the first photoelectric element means, which produces a first output signal indicating the detected magnitude of the electric power;
a load driven by the electric power obtained by the first photoelectric element means, which produces a second output signal; and
first light emitting element means for emitting, to the optical path, a second light signal conveying the first and second output signals; and
a second section including:
second light emitting element means for emitting optical power in the form of the first light signal to the first photoelectric element means through the optical path;
second photoelectric element means for converting the second light signal transmitted from the first light emitting element means to the second section through the optical path into an electric signal expressing the first and second output signals; and
means for controlling an amount of light emission by the second light emitting element means by changing the given electric power in accordance with the magnitude of the electric power indicated by the first output signal expressed in the electric signal obtained by the second photoelectric element means, such that the magnitude of the electric power at the second photoelectric element means is maintained to be substantially constant.

2. The system of claim 1, wherein the detecting means comprises comparator means for comparing the electric power obtained by the first photoelectric element means with prescribed reference values specifying a preferable range for the electric power, which produces the first output signal capable of indicating a deviation of the electric power from the preferable range, and wherein the controlling means changes the given electric power in accordance with the deviation of the electric power indicated by the first output signal.

3. The system of claim 2, wherein the first output signal is a binary signal with two levels representing occurrence of increase of the electric power beyond the preferable range and occurrence of decrease of the electric power beyond the preferable range.

4. The system of claim 3, wherein the second output signal is in a form of a frequency signal represented by single pulse intervals, and wherein the second light signal comprises intervals given by signal pulses and double pulses where the intervals representing the frequency signal of the second output signal and the single pulses and the double pulses representing two levels of the binary signal of the first output signal.

5. The system of claim 3, wherein the given electric power is decreased monotonously while the first output signal is on a level representing the occurrence of increase of the electric power beyond the preferable range, whereas the given electric power is increased monotonously while the first output signal is on a level representing the occurrence of decrease of the electric power beyond the preferable range.

6. The system of claim 1, further comprising alternating current transformer means for transforming the electric power obtained by the first photoelectric element means to a transformed electric power at a desired level for the load, and wherein the detecting means detects the magnitude of the transformed electric power, the first output signal indicates the magnitude of the transformed electric power, the load is driven by the transformed electric power, and the controlling means controls the given electric power in accordance with the magnitude of the transformed electric power.

7. The system of claim 6, wherein the alternating current transformer means possesses such a ratio of number of turns on its primary and secondary sides that a matching can be made between an impedance required by the load and a load impedance of the first photoelectric element means at a maximal efficiency for converting the optical power into the electric power.

8. The system of claim 6, wherein the first photoelectric element means comprises a single photo cell.

9. The system of claim 6, further comprising a rectifier smoothing circuit for converting alternating voltage into direct voltage between the alternating current transformer and the load.

10. The system of claim 6, further comprising a commutating circuit between the alternating current transformer and the load.

11. The system of claim 1, wherein the second light emitting element means is a semiconductor laser.

12. The system of claim 1, wherein the load is a small electronic device requiring little electric power.

* * * * *